(12) United States Patent
Odenwald et al.

(10) Patent No.: US 8,677,064 B2
(45) Date of Patent: Mar. 18, 2014

(54) VIRTUAL PORT MAPPED RAID VOLUMES

(75) Inventors: Louis Odenwald, Wichita, KS (US); Jason A. Unrein, Wichita, KS (US)

(73) Assignee: LSI Corporation, San Jose, CA (US)

( * ) Notice: Subject to any disclaimer, the term of this patent is extended or adjusted under 35 U.S.C. 154(b) by 535 days.

(21) Appl. No.: 12/956,682

(22) Filed: Nov. 30, 2010

(65) Prior Publication Data
US 2012/0137065 A1 May 31, 2012

(51) Int. Cl.
*G06F 12/00* (2006.01)

(52) U.S. Cl.
USPC .......................................................... 711/114

(58) Field of Classification Search
None
See application file for complete search history.

(56) References Cited

U.S. PATENT DOCUMENTS

| | | | |
|---|---|---|---|
| 7,085,883 B1 * | 8/2006 | Dalgic et al. | 711/114 |
| 7,606,239 B2 | 10/2009 | Maveli et al. | |
| 7,991,860 B2 * | 8/2011 | Otani | 709/221 |
| 2011/0219158 A1 * | 9/2011 | Davis et al. | 710/300 |

OTHER PUBLICATIONS

"Serial attached SCSI" http://en.wikipedia.org/wiki/Serial_Attached_SCSI as archived by www.archive.org on Feb. 27, 2010.*

* cited by examiner

*Primary Examiner* — Sanjiv Shah
*Assistant Examiner* — Daniel Tsui
(74) *Attorney, Agent, or Firm* — Yee & Associates, P.C.

(57) ABSTRACT

Embodiments of the invention provide a method associated with a RAID configuration, wherein RAID storage volumes are created by RAID controllers from a shared pool of disk drives. A specified RAID volume is mapped to a virtual target port, and is accessed by each of one or more servers via the virtual target address. One embodiment of the invention is directed to a method associated with multiple RAID controllers, and a pool of disk drives that comprises multiple storage disks. The method comprises operating one or more of the RAID controllers to each configure one or more RAID volumes from selected storage disks. A unique identifier is assigned to each of the RAID volumes, wherein a specified RAID volume is assigned a specified unique identifier, and a particular RAID controller is provided with ownership of the specified RAID volume at a particular time. The method further comprises using the specified unique identifier in an address to route an I/O message at the particular time between a selected host and the specified RAID volume, wherein the unique identifier includes no information that identifies the particular RAID controller.

20 Claims, 6 Drawing Sheets

VIRTUAL PORT MAPPED RAID VOLUMES

BACKGROUND OF THE INVENTION

1. Field of the Invention

The invention disclosed and claimed herein pertains to a cluster of RAID controllers and a shared pool of storage disks, wherein the controllers configure RAID storage volumes from selected disks, and one or more host servers must be able to access respective volumes. More particularly, the invention pertains to an arrangement or system of the above type wherein a server is able to access a specified RAID volume, without being cognizant of which RAID controller either configured or has ownership of the specified volume.

2. Description of the Related Art

In a RAID data storage scheme, a group or cluster of RAID controllers is generally provided, wherein each RAID controller is a physical entity that a host server talks to or communicates with. Typically, the RAID controllers are associated with a pool of storage disks. A controller can be used to configure or partition portions of the disk storage capacity into one or more RAID storage volumes, wherein each storage volume is represented by a logical unit number (LUN).

At present, when a server or other host seeks to talk to a specified RAID volume, the host must address the particular RAID controller that controls or owns the specified volume at that time. An effort to establish such communication with the specified volume must therefore include an identifier or address for the particular RAID controller, as well as the LUN or other identifier for the specified volume. Thus, from the point of view of the host, the specified volume is always associated with the particular controller. The host sees the particular RAID controller as a single target, with one or more LUNs.

In view of this current arrangement, a host that seeks to access the specified volume must keep track of the RAID controller that controls or has ownership of the specified volume. Initially, this would be the RAID controller that configured the specified RAID volume. However, over time the owning RAID controller could change. For example, the specified RAID volume could be configured by a first RAID controller, which then went down or became inoperable. It would thus become necessary to switch the specified volume to a second RAID controller.

When this occurs, it is essential to ensure that the host is aware of the change in controllers. The host must have such information, so that it can direct subsequent I/O messages for the specified volume to the second RAID controller, rather than to the first. In certain currently available systems, host servers must be provided with a substantial amount of software, for use in keeping track of which RAID controller in a cluster must be used to communicate with each RAID volume. This software could include, for example, a vendor specific multipathing driver stack, or a standard OS multipathing driver stack.

SUMMARY OF THE INVENTION

Embodiments of the invention provide a method associated with a RAID configuration, wherein RAID storage volumes are created by RAID controllers from a shared pool of disk drives. A specified RAID volume is mapped to a virtual target port, and is accessed by each of one or more servers via the virtual target address. The RAID controller that owns or is hosting the specified RAID volume at the time of access is of no concern to the accessing server. Thus, an important benefit provided by the invention is minimal downtime in changing ownership of a RAID volume from a first RAID controller to a second RAID controller, if a problem occurs in the first controller. However, the invention is not limited thereto.

One embodiment of the invention is directed to a method associated with multiple RAID controllers, and a pool of disk drives that comprises multiple storage disks. The method comprises operating one or more of the RAID controllers to each configure one or more RAID volumes from selected storage disks. A unique identifier is assigned to each of the RAID volumes, wherein a specified RAID volume is assigned a specified unique identifier, and a particular RAID controller is provided with the ownership of the specified RAID volume at a particular time. The method further comprises using the specified unique identifier in an address to route an I/O message at the particular time between a selected host server and the specified RAID volume, wherein the address includes no information that identifies the particular RAID controller.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
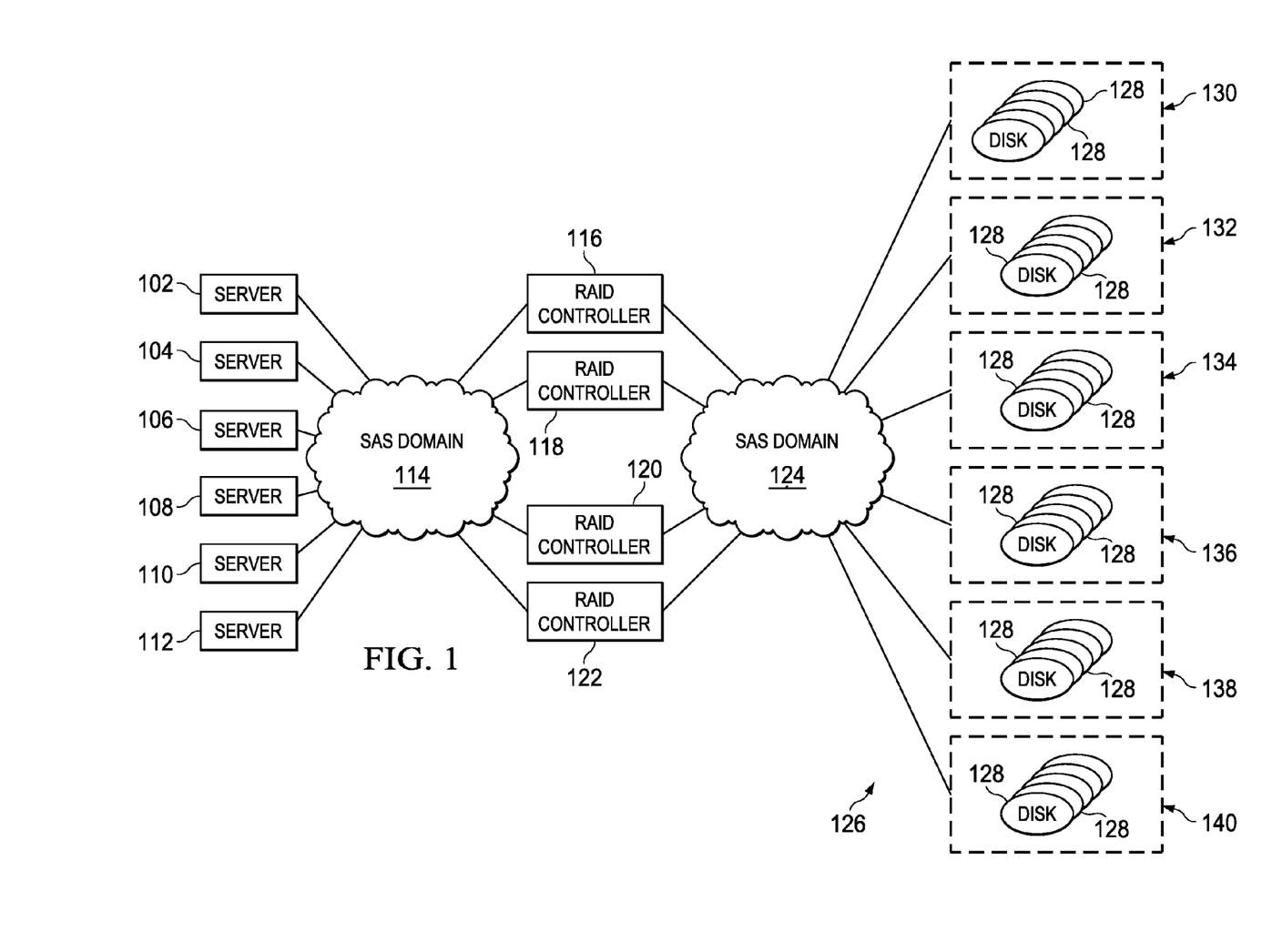
FIG. 1 is a block diagram depicting an SAS domain cloud environment, which contains respective components for implementing an embodiment of the invention.

Referring to FIG. 1, there is shown a bank of host servers 102-112, which are respectively connected by a computer bus 114 to each one of a cluster of RAID controllers 116-122. FIG. 1 further shows each RAID controller 116-122 connected to a disk drive pool 126, comprising multiple disk drive storage mechanisms, or disks, 128. Bus 114 and 124 each usefully comprises a Serial Attached SCSI (SAS) domain bus, which is an I/O system used to move data to and from computer storage devices. This I/O system consists of a set of SAS devices that communicate with one another by means of a service delivery subsystem. These devices include both initiator and target components, described hereinafter in further detail. Each SAS device in an SAS domain has a globally unique identifier, which is referred to as the SAS address for the device.

Referring further to FIG. 1, there is shown a number of the disk drives 128 grouped or clustered into each of a plurality of disk sets 130-140. These sets may respectively be referred to as JBODs 130-140, wherein the acronym JBOD refers to "Just a Bunch of Disks" or "Just a Bunch of Drives". Each drive 128 usefully contains one or more rotatable internal disks or storage platters, a power source and a read-write head. However, embodiments of the invention are not limited thereto.

As is known by those of skill in the art, a RAID data storage system refers to an arrangement for dividing and replicating data among multiple disk drives, such as disk drives 128. A RAID system is generally intended to achieve either one or both of the objectives of increasing input/output performance, and increasing data reliability. RAID storage volumes for achieving these objectives can be configured from selected disk drives. In FIG. 1, each of the RAID controllers 116-122 comprises a hardware device for configuring one or more RAID storage volumes from storage capacity provided by selected disk drives 128 of the drive pool 126.

After a particular RAID controller configures a specified RAID volume, that particular controller controls or has ownership of the specified volume. It is to be appreciated that a given RAID controller could have ownership of multiple RAID volumes at the same time. Moreover, ownership of a RAID volume can be transferred or migrated from one RAID controller to another. Such transfer could occur, for example, in the event of failover, or to achieve load balancing among respective RAID controllers.

If one of the servers 102-112 seeks to access a specified RAID volume that is owned or controlled by a particular one of the RAID controllers 116-122, the server would have to go through that particular controller. To provide server access in accordance with embodiments of the invention, each RAID volume after being created is mapped to, or associated with, a virtual target port. The RAID controller that creates or configures a RAID volume assigns a unique identifier or address thereto, wherein the identifier assigned to a specified RAID volume includes or contains no information that identifies any RAID controller, including the RAID controller that configured or owns the specified RAID volume. A server 102 is thus enabled to access the specified RAID volume directly, by using or addressing only the unique volume identifier.

Figure 2:
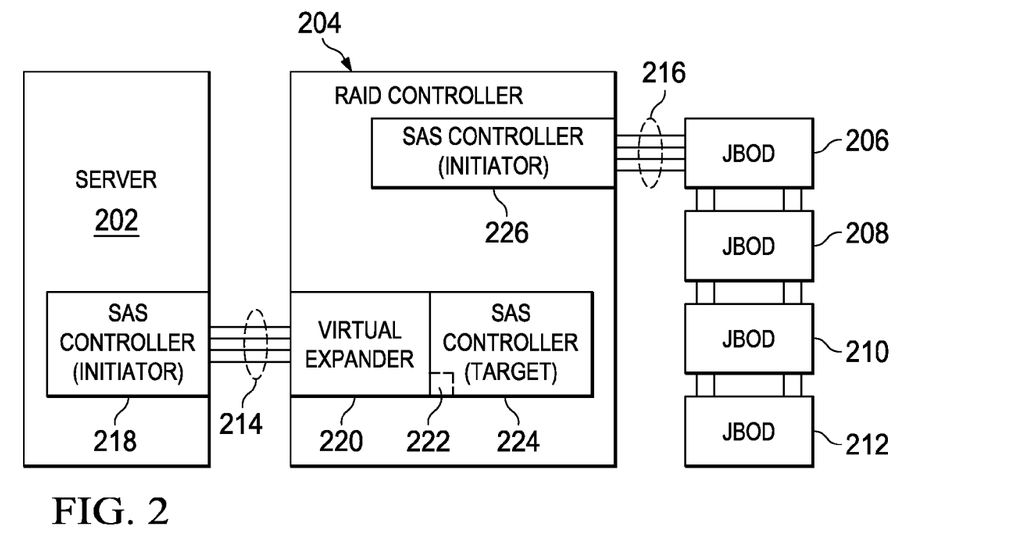
FIG. 2 is a block diagram that shows selected components of FIG. 1 in further detail.

Referring to FIG. 2, there are shown certain components of FIG. 1 in further detail, which may be used in implementing embodiments of the invention. More particularly, server 202 comprises a selected one of the servers 102-112 of FIG. 1, and RAID controller 204 comprises a selected one of the RAID controllers 116-122. JBODs 206-212 include selected ones of the JBODs 130-140. Bus 214 and bus 216 include portions of SAS domain buses 114 and 124, respectively.

FIG. 2 further shows the server 202 provided with an SAS initiator controller component 218. RAID controller 204 is provided with both an SAS target controller component 224, and an SAS initiator controller component 226. In association with an SAS domain bus as disclosed herein, initiator controllers 218 and 226 each comprise a device that originates device service and task management requests for processing by target devices, and receives responses for such requests from respective target devices. An initiator controller can be provided, for example, as an on board component on the motherboard, or as an add-on host bus adapter. Target controller 224 is a device that receives device service and task management requests for processing, from SAS initiator controllers of the above type, and sends responses for the requests back to the initiator controllers. FIG. 2 shows target controller 224 of RAID controller 204 connected to exchange I/O messages with initiator 218 of server 202.

Referring further to FIG. 2, there is shown a virtual expander 220 included in the target controller 224. In an SAS system, an expander 220 comprises a component for facilitating communication between large numbers of SAS devices. The expander contains multiple expander output ports, and also contains a target port. FIG. 2 further shows target controller 224 provided with a routing table 222 or like component, which is used in association with the expander 220 as described hereinafter in further detail.

It is to be appreciated that each of the servers 102-112 of FIG. 1 is provided with an initiator controller 218 as described above. Similarly, each of the RAID controllers 116-122 of FIG. 1 is provided with a target controller 224, each having a virtual expander 220 and a routing table 222, and is further provided with an initiator controller 226. Moreover, all of the servers 102-112 have physical connectivity to all of the RAID controllers 116-122, and all of the RAID controllers 116-122 have physical connectivity to all of the disks 128 of drive pool 126.

In an embodiment of the invention, when the RAID controller 204 configures a specified RAID storage volume from disks of drive pool 126, as described above, RAID controller 204 assigns a unique identifier to the specified volume, wherein the assigned identifier comprises a unique SAS address. This unique identifier is then placed into the routing table 222 of target controller 224 of RAID controller 204, together with information that provides the physical location of the disks 128 that were used to create the specified RAID volume. Such information thus comprises destination information, for use in routing an I/O request or other message to the specified volume.

RAID controller 204, upon configuring the specified RAID volume, initially owns such volume. Accordingly, the SAS target controller 224 of RAID controller 204 has the task of presenting or advertising the specified volume, along with its unique identifier, to servers such as server 202. If server 202 then decides to access the specified RAID volume, in order to send an I/O request or the like thereto, the server uses the unique identifier of the specified volume, also known as the virtual target address (TARGET: 0) to route the request. This address information directs the request to the target port of the virtual expander 220, associated with the target controller 224 that advertised the specified RAID volume. By using the unique identifier of the specified RAID volume with the pertinent information contained in routing table 222, target controller 224 is able to validate ownership of the specified RAID volume. RAID controller 204 then sends the request to such location, by means of initiator controller 226 of RAID controller 204. It will be seen that in this procedure, any address or routing information which identifies the particular RAID controller 204 having ownership of the specified volume would not be necessary.

In the event that ownership of the specified RAID volume is transferred at some time from RAID controller 204 to a second RAID controller, the unique identifier for the specified volume, together with its physical location or destination information, is similarly transferred from the target controller 224 of controller 204 to a routing table in a target controller of the second RAID controller. Such target controller also has a virtual expander that is similar or identical to expander 220. The target controller of the second RAID controller would then become responsible for advertising the specified RAID volume to respective servers. In this case, if a server sought to send an I/O request to the specified RAID volume using the unique identifier, the target port of the virtual expander for the second RAID controller would receive the request. The target controller of the second RAID controller would route the request to the specified volume, using the initiator controller of the second RAID controller.

By providing each RAID controller with an SAS target controller that includes a virtual expander 220 and routing table 222, for operation as described above, a server does not need to be concerned about the identity or address of the particular RAID controller that owns a specified RAID volume. Accordingly, it is not necessary for the servers to monitor or keep track of such ownership. Moreover, because virtual expander 220 has multiple output ports, expander 220 can be used by a RAID controller 204 to access any one of multiple RAID storage volumes.

Figure 3:
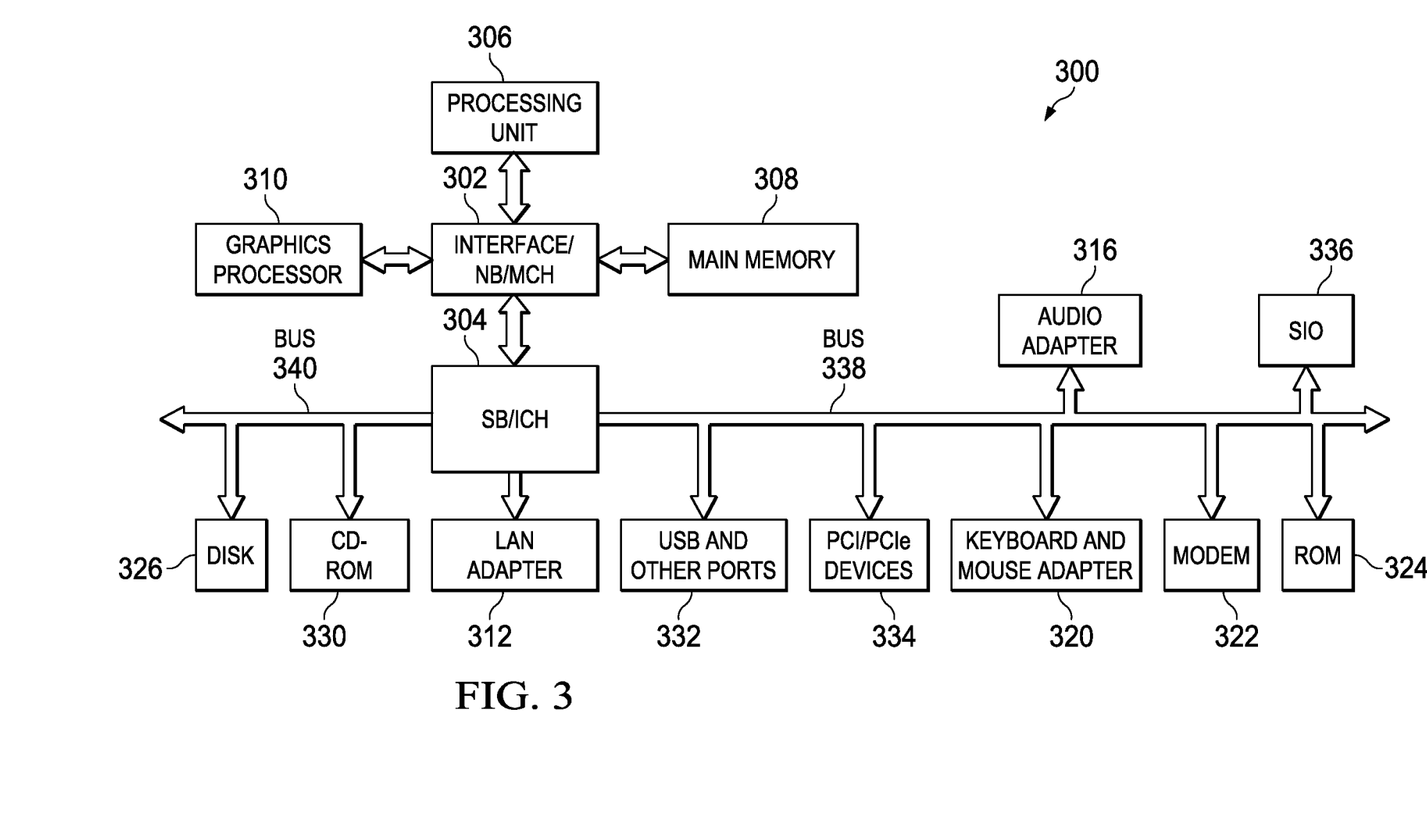
FIG. 3 is a block diagram showing a data processing system which may be used as one or more of the components of the embodiment of FIG. 1.

Referring to FIG. 3, there is shown a block diagram of a data processing system 300 in which aspects of the present invention may be implemented. Data processing system 300 is an example of a computer, such as for server 202 or controller 204 of FIG. 2, in which computer usable code or instructions implementing the processes for embodiments of the present invention may be located. In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306 and coordinates and provides control of various components within data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for embodiments of the present invention are performed by processing unit 306 using computer usable program code, which may be located in a memory such as, for example, main memory 308, ROM 324, or in one or more peripheral devices 326 and 330.

In some illustrative examples, data processing system 300 may be a personal digital assistant (PDA), which is configured with flash memory to provide non-volatile memory for storing operating system files and/or user-generated data.

A bus system may be comprised of one or more buses, such as bus 338 or bus 340 as shown in FIG. 3. Of course, the bus system may be implemented using any type of communication fabric or architecture that provides for a transfer of data between different components or devices attached to the fabric or architecture. A communication unit may include one or more devices used to transmit and receive data, such as modem 322 or network adapter 312 of FIG. 3. A memory may be, for example, main memory 308, ROM 324, or a cache such as found in NB/MCH 302 in FIG. 3.

Figure 4:
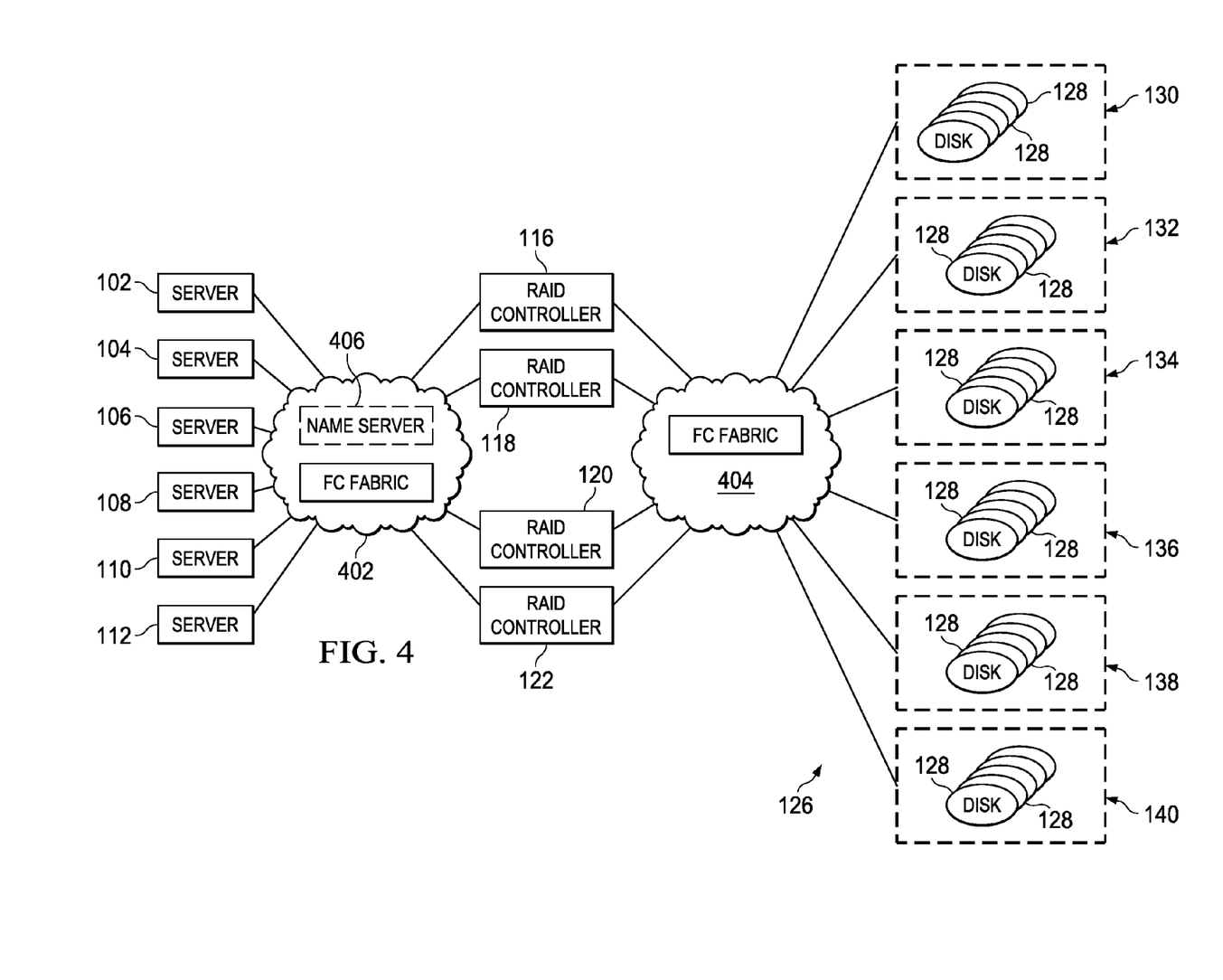
FIG. 4 is a block diagram depicting a fibre channel fabric cloud environment, which contains respective components for implementing an embodiment of the invention.

Referring to FIG. 4, there is shown a further embodiment of the invention. The embodiment of FIG. 4 discloses a system that includes servers 102-112, RAID controllers 116-122 and JBODs 130-140 of FIG. 1. However, instead of SAS domain 114, servers 102-112 are connected to each of the RAID controllers 116-122 by means of a computer bus comprising a Fibre Channel (FC) fabric 402. Similarly, each RAID controller 116-122 is connected to the respective disks 128 of drive pool 126 by means of an FC fabric 404. FIG. 4 further shows the FC fabric 404 provided with a name server 406.

In the embodiment of FIG. 4, when a RAID controller configures a specified RAID storage volume from disks of drive pool 126, in the manner described above, the RAID controller assigns a unique identifier to the specified volume that comprises a World Wide Name (WWN). In an FC fabric, the WWN is a globally unique identifier. However, this identifier, in like manner with the identifier used in connection with the SAS domain, does not identify or indicate the RAID controller that owns the specified RAID volume.

N_Port ID Virtualization (NPIV) is used to associate the WWN for the specified RAID volume with a unique port identifier and register it with the name server 406, together with information that identifies the physical location of, or the destination to, the specified RAID volume. If a server 102-112 seeks to send an I/O message to the specified RAID volume, the server would access the name server 406, using the WWN assigned to such volume. The name server would then furnish the information needed to route the I/O message to the specified RAID volume.

If ownership of the specified RAID volume is subsequently changed to another RAID controller, a server 102-112 will still be able to access the specified volume, simply by means of looking up the port identifier associated with the WWN identifier and the name server 406. Reference to the other RAID controller will not be necessary.

In the embodiments of FIGS. 1 and 4, each of the servers do not see a configured RAID storage volume as being associated with a particular controller, e.g. TARGET: LUN. Rather, a server simply sees the RAID volume as a unique and independent target, e.g., TARGET: 0, just as it would see a disk. In view of this, the ownership of a RAID volume can be freely migrated from one RAID controller to another, without any need for the servers to monitor or keep track of such ownership. As a result, the servers may be relieved of significant software burdens. From the server's point of view, a RAID volume is a target that physically moves within the SAS domain or FC fabric, similar to moving a drive from one bay to another.

Figure 5:
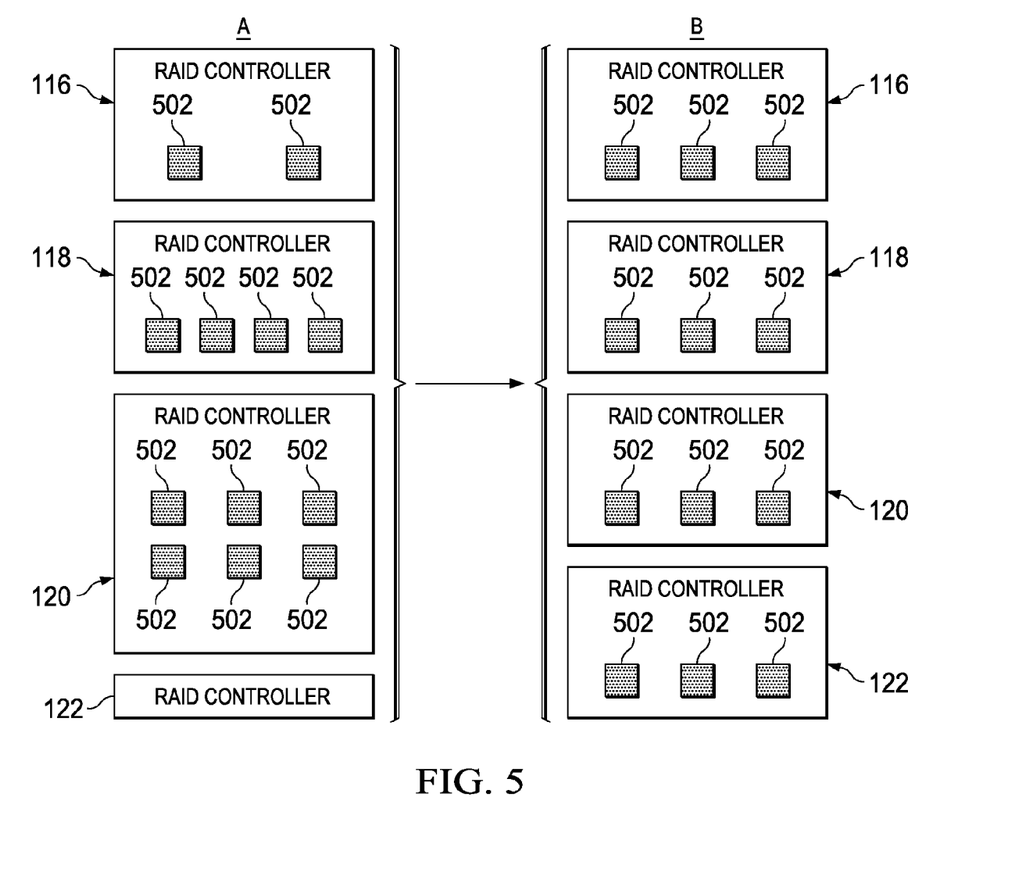
FIGS. 5-6 are schematic diagrams that respectively illustrate benefits provided by embodiments of the invention.

By enhancing the migration of RAID volume ownership among RAID controllers, embodiments of the invention can provide significant benefits in systems such as those depicted in FIGS. 1 and 4. One such benefit, directed to load balancing, is illustrated by FIG. 5. In column A, FIG. 5 shows RAID controllers 116-122, wherein controller 116 controls or has ownership of two RAID storage volumes, each represented as an object 502. Controller 118 has four volumes 502, controller 120 has six volumes 502 and controller 122 has no volumes, for a total of twelve volumes.

By using the migration capability of embodiments of the invention, ownership of respective RAID volumes can be balanced among the RAID controllers. This is illustrated at column B of FIG. 5, wherein the RAID volumes 502 are shown distributed equally among the RAID controllers 116-122, with three volumes 502 owned by each controller. The volumes can either be balanced to average the number of volumes per RAID controller, or to average the active volume I/Os across controllers.

Figure 6:
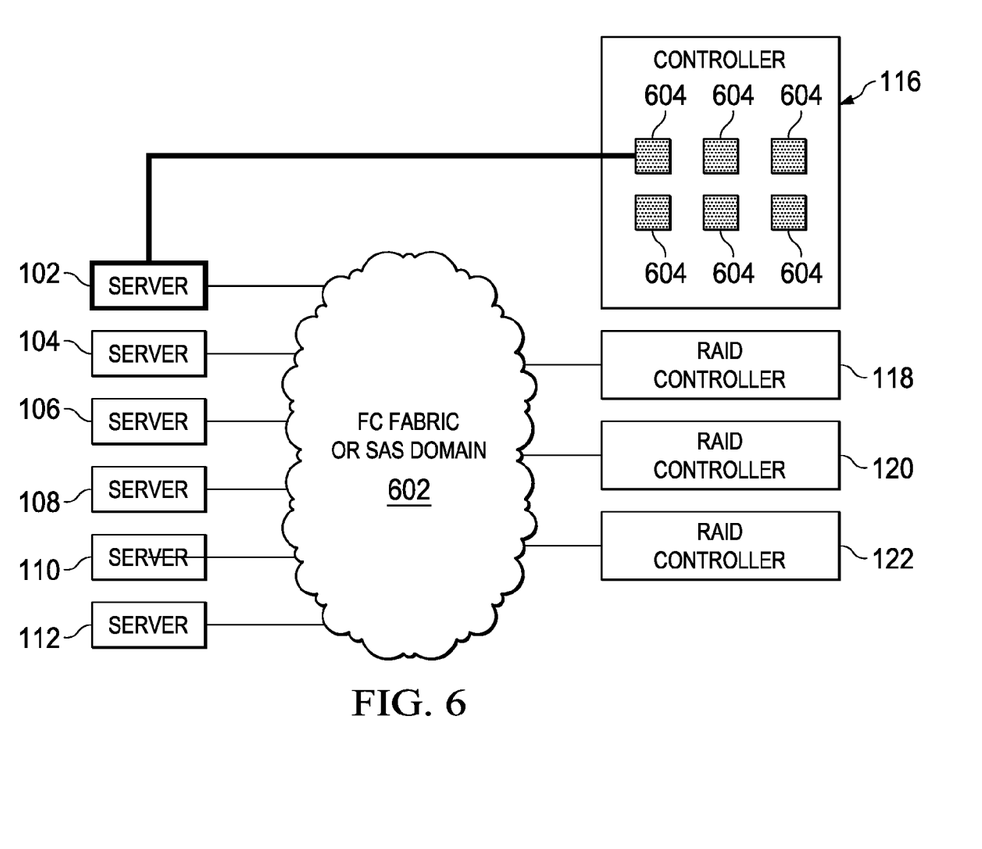

Referring to FIG. 6, servers 102-112 and RAID controllers 116-122 are shown to illustrate the volume migration capability used to achieve power conservation. FIG. 6 further shows the servers 102-112 connected to respective RAID controllers 116-122 by a bus comprising either an FC fabric or an SAS domain 602. By means of RAID volume migration as described herein, inactive volumes can be compressed onto one or a few RAID controllers, allowing the remainder to be powered down. For example, FIG. 6 shows six volumes 604 migrated to RAID controller 116, with no volumes left on controllers 118-122. Thus, during periods of low utilization at least some of the servers, RAID controllers and their associated drives can go into low power modes. Conversely, the controllers can be woken up as volume activity increases.

Figure 7:
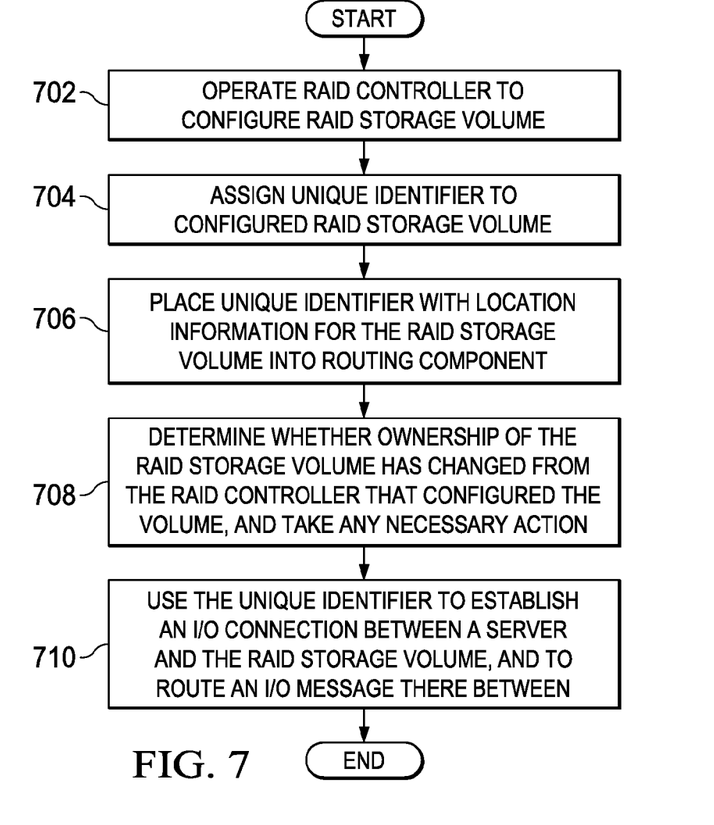
FIG. 7 is a flowchart showing steps for a method comprising an embodiment of the invention.

Referring to FIG. 7, there is shown a flowchart depicting steps for a method comprising an embodiment of the invention. At step 702, a RAID controller is operated to configure a RAID storage volume. A unique identifier is then assigned to the RAID storage volume at step 704. As described above, the unique identifier could be an SAS address, if the RAID system uses an SAS domain. The unique identifier could be a World Wide Name, if the RAID system uses an FC fabric. At step 706, the unique identifier is placed into a routing component, together with location information for the RAID volume. As described above, the routing component could be an SAS target controller with an expander for an SAS system, or could be a name server for a system that used FC fibre channel.

Referring further to FIG. 7, step 708 provides for determining whether ownership of the RAID storage volume has changed from the RAID controller that configured the volume. When this has happened and an SAS system is being used, the SAS target controller of the RAID controller that received volume ownership would have to be properly adapted. At step 710, the unique identifier is used to establish an I/O connection between a server and the RAID storage volume, and to route a message therebetween. The method of FIG. 7 is then concluded.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the illustrative embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for mapping RAID volumes in a data processing system that includes a plurality of RAID controllers and a pool of disk drives that comprises multiple storage disks, the method comprising the steps of:

operating a first one of the plurality of RAID controllers to configure a particular RAID volume of the RAID volumes from selected storage disks;

including a target controller and an expander in each one of the plurality of RAID controllers;

including a routing table in the target controller in each one of the plurality of RAID controllers;

assigning a unique identifier to each one of the RAID volumes, wherein a specified unique identifier is assigned to the particular RAID volume;

providing the first one of the plurality of RAID controllers with ownership of the particular RAID volume at a particular time;

storing the specified unique identifier in a first routing table that is included in a first target controller in the first one of the plurality of RAID controllers;

using the specified unique identifier, which is stored in the first routing table, in an address to route an I/O message at said particular time between a selected one of a plurality of host servers and the particular RAID volume, wherein said address includes no information that identifies any of the plurality of RAID controllers;

responsive to transferring ownership of the particular RAID volume from the first one of the plurality of RAID controllers to a second one of the plurality of RAID controllers, storing the specified unique identifier in a second routing table that is included in a second target controller in the second one of the plurality of RAID controllers; and advertising, by the second one of the plurality of RAID controllers, the particular RAID volume to the plurality of host servers after ownership of the particular RAID volume has been transferred to the second one of the plurality of RAID controllers, wherein the I/O message is received by the second one of the plurality of RAID controllers and not by the first one of the plurality of RAID controllers after the transfer.

2. The method of claim 1, further comprising:

connecting said selected one of the plurality of host servers to the plurality of RAID controllers using a prespecified computer bus; and using the first and second routing tables to map the specified unique identifier to destination information that is used to route the I/O message to the particular RAID volume.

3. The method of claim 1, further comprising:
establishing an I/O connection between the selected one of the plurality of host servers and the particular RAID volume using said specified unique identifier to enable the selected one of the plurality of host servers to map directly to the particular RAID volume without reference to any of the plurality of RAID controllers.

4. The method of claim 2, wherein the prespecified computer bus comprises an SAS domain bus and the target controller in each one of the plurality of RAID controllers comprises an SAS target controller, wherein each SAS target controller is provided with an expander having a target port, and further wherein each SAS target controller is adapted to communicate with an SAS initiator controller that is included in the selected one of the plurality of host servers.

5. The method of claim 4, wherein the specified unique identifier comprises a unique SAS address.

6. The method of claim 2, wherein the prespecified computer bus comprises a Fibre Channel (FC) fabric.

7. The method of claim 6, wherein said specified unique identifier comprises a World Wide Name (WWN), and wherein NPIV is used to associate the WWN for the particular RAID volume.

8. The method of claim 1, further comprising:
advertising, by the first one of the plurality of RAID controllers, the particular RAID volume to the plurality of host servers prior to ownership of the particular RAID volume being transferred to the second one of the plurality of RAID controllers; and
wherein the first one of the plurality of RAID controllers no longer advertises the particular RAID volume to the plurality of host servers after ownership of the particular RAID volume has been transferred to the second one of the plurality of RAID controllers.

9. The method of claim 1, further comprising:
including a virtual expander in each one of the plurality of RAID controllers;
including an initiator controller in the select one of the plurality of host servers, wherein the selected one of the plurality of host servers communicates with each one of the plurality of RAID controllers using the virtual expander that is included in the target controller in each one of the plurality of RAID controllers; and
including an initiator controller in each one of the plurality of RAID controllers for communicating with the pool of disk drives.

10. The method of claim 1, further comprising:
using the specified unique identifier, which is stored in the second routing table, to route the I/O message between the selected one of the plurality of host servers and the particular RAID volumes after the transfer.

11. An apparatus for mapping RAID volumes in a data processing system that includes a plurality of RAID controllers and a pool of disk drives that comprises multiple storage disks, the apparatus comprising:
a first one of the plurality of RAID controllers configuring a particular RAID volume of the RAID volumes from selected storage disks;
wherein a target controller and an expander are included in each one of the plurality of RAID controllers;
wherein a routing table is included in the target controller in each one of the plurality of RAID controllers;
wherein a unique identifier is assigned to each one of the RAID volumes, and wherein a specified unique identifier is assigned to the particular RAID volume;
wherein the first one of the plurality of RAID controllers owns the particular RAID volume at a particular time;
wherein the specified unique identifier is stored in a first routing table that is included in a first target controller in the first one of the plurality of RAID controllers;
a plurality of host servers, wherein the specified unique identifier is used in an address to route an I/O message at said particular time between a selected one of the plurality of host servers and the particular RAID volume, wherein said address includes no information that identifies any of the plurality of RAID controllers;
a second one of the plurality of RAID controllers, responsive to transferring ownership of the particular RAID volume from the first one of the plurality of RAID controllers to the second one of the plurality of RAID controllers, storing the specified unique identifier in a second routing table that is included in a second target controller in the second one of the plurality of RAID controllers; and
the second one of the plurality of RAID controllers advertising the particular RAID volume to the plurality of host servers after ownership of the particular RAID volume has been transferred to the second one of the plurality of RAID controllers, wherein the I/O message is received by the second one of the plurality of RAID controllers and not by the first one of the plurality of RAID controllers after the transfer.

12. The apparatus of claim 11, wherein said selected one of the plurality of host servers is connected to the plurality of RAID controllers using a prespecified computer bus; and wherein the first and second routing tables are used to map the specified unique identifier to destination information that is used to route the I/O message to the particular RAID volume.

13. The apparatus of claim 12, wherein the prespecified computer bus comprises an SAS domain bus and the target controller in each one of the plurality of RAID controllers comprises an SAS target controller, wherein each SAS target controller is provided with an expander having a target port, and further wherein each SAS target controller is adapted to communicate with an SAS initiator controller that is included in the selected one of the plurality of host servers.

14. The apparatus of claim 12, wherein the prespecified computer bus comprises a Fibre Channel (FC) fabric.

15. A method for mapping RAID volumes in a data processing system that includes a plurality of RAID controllers and a pool of disk drives that comprises multiple storage disks, the method comprising the steps of:
operating a first one of the plurality of RAID controllers to configure a particular RAID volume of the RAID volumes from selected storage disks;
including a target controller and an expander in each one of the plurality of RAID controllers;
including a routing table in the target controller in each one of the plurality of RAID controllers;
assigning a unique identifier to each one of the RAID volumes, wherein a specified unique identifier is assigned to the particular RAID volume;
providing the first one of the plurality of RAID controllers with ownership of the particular RAID volume at a particular time;
storing the specified unique identifier in a first routing table that is included in a first target controller in the first one of the plurality of RAID controllers;
using the specified unique identifier, which is stored in the first routing table, in an address to route an I/O message at said particular time between a selected one of a plurality of host servers and the particular RAID volume, wherein said address includes no information that identifies any of the plurality of RAID controllers;

responsive to transferring ownership of the particular RAID volume from the first one of the plurality of RAID controllers to a second one of the plurality of RAID controllers, storing the specified unique identifier in a second routing table that is included in a second target controller in the second one of the plurality of RAID controllers;

advertising, by the first one of the plurality of RAID controllers, the particular RAID volume to the plurality of host servers prior to ownership of the particular RAID volume being transferred to the second one of the plurality of RAID controllers; and advertising, by the second one of the plurality of RAID controllers, the particular RAID volume to the plurality of host servers after ownership of the particular RAID volume being transferred to the second one of the plurality of RAID controllers, wherein the first one of the plurality of RAID controllers no longer advertises the particular RAID volume to the plurality of host servers after ownership of the particular RAID volume has been transferred to the second one of the plurality of RAID controllers.

16. The method of claim 15, further comprising:
connecting said selected one of the plurality of host servers to the plurality of RAID controllers using a prespecified computer bus; and
using the first and second routing tables to map the specified unique identifier to destination information that is used to route the I/O message to the particular RAID volume.

17. The method of claim 15, further comprising:
establishing an I/O connection between the selected one of the plurality of host servers and the particular RAID volume using said specified unique identifier to enable the selected one of the plurality of host servers to map directly to the particular RAID volume without reference to any of the plurality of RAID controllers.

18. The method of claim 16, wherein the prespecified computer bus comprises an SAS domain bus and the target controller in each one of the plurality of RAID controllers comprises an SAS target controller, wherein each SAS target controller is provided with an expander having a target port, and further wherein each SAS target controller is adapted to communicate with an SAS initiator controller that is included in the selected one of the plurality of host servers.

19. The method of claim 16, wherein the prespecified computer bus comprises a Fibre Channel (FC) fabric.

20. The apparatus of claim 11, further comprising:
the first one of the plurality of RAID controllers advertising the particular RAID volume to the plurality of host servers prior to ownership of the particular RAID volume being transferred to the second one of the plurality of RAID controllers; and
wherein the first one of the plurality of RAID controllers no longer advertises the particular RAID volume to the plurality of host servers after ownership of the particular RAID volume has been transferred to the second one of the plurality of RAID controllers.

* * * * *